United States Patent [19]

Bridgeford

[11] Patent Number: 4,489,114

[45] Date of Patent: Dec. 18, 1984

[54] ARABINOGALACTANS AS RELEASE ADDITIVES FOR CELLULOSE CONTAINING CASINGS

[75] Inventor: Douglas J. Bridgeford, Champaign, Ill.

[73] Assignee: Teepak, Inc., Oakbrook, Ill.

[21] Appl. No.: 474,760

[22] Filed: Mar. 14, 1983

[51] Int. Cl.$^3$ .................................................. A22C 13/00
[52] U.S. Cl. .................................................. 428/36; 138/118.1; 106/163.1; 106/173 R; 106/205; 106/208
[58] Field of Search .............. 106/163 R, 173 R, 205, 106/208; 138/118.1; 428/36

[56] References Cited

U.S. PATENT DOCUMENTS

| | | | |
|---|---|---|---|
| 2,010,626 | 8/1935 | Dietrich | 17/49 |
| 2,073,616 | 3/1937 | Acree | 536/128 |
| 2,583,654 | 1/1952 | Korsgaard | 17/49 |
| 2,722,714 | 11/1955 | Blizzard et al. | 17/42 |
| 2,722,715 | 11/1955 | Blizzard et al. | 17/49 |
| 2,723,201 | 11/1955 | Blizzard et al. | 138/118.1 |
| 3,325,473 | 6/1967 | Herrick et al. | 536/127 |
| 3,337,526 | 8/1967 | Adams | 536/128 |
| 3,451,827 | 6/1969 | Bridgeford | 138/118.1 |
| 3,509,126 | 4/1970 | Dahl | 536/2 |
| 3,898,348 | 8/1975 | Chiu et al. | 138/118.1 |
| 3,981,046 | 9/1976 | Chiu | 138/118.1 |
| 4,137,947 | 2/1979 | Bridgeford | 138/118.1 |

*Primary Examiner*—John E. Kittle
*Attorney, Agent, or Firm*—Howard M. Ellis; Michael L. Dunn

[57] ABSTRACT

This invention relates to Arabinogalactan containing release coatings, Arabinogalactan coated food casings and a method for their production, which comprises applying to the food containing surface thereof an aqueous coating composition containing less than 3 percent by weight Arabinogalactan. The coated food casings exhibit improved food release characteristics, improved resistance to strand breakage and improved anti-pleat lock characteristics.

27 Claims, No Drawings

4,489,114

ARABINOGALACTANS AS RELEASE ADDITIVES FOR CELLULOSE CONTAINING CASINGS

TECHNICAL FIELD

This invention relates to Arabinogalactan release additives, to improved food casings and more particularly to Arabinogalactan containing coatings for cellulosic containing food casings which impart food release characteristics thereto while improving strand strength and anti-pleat lock characteristics.

BACKGROUND OF THE INVENTION

The packaging of items in flexible form fitting encasements is practiced worldwide with multifarious products. Such means of encasement is particularly suitable for consumer packaging and/or processing packaging of emulsified foods in casings, such as sausage meat products, processed dairy cheese products and other foods of similar consistency. In many such packaging applications, the speed and efficiency of the packaging process is particularly dependent upon the ability of the casing to withstand various folding and other stresses, where failure would render a casing unsuitable for stuffing. One typical type of casing which is subject to particularly stressful handling is the regenerated shirred cellulose containing casing used in the production of sausages.

BACKGROUND ART

In the manufacture of regenerated cellulose sausage casings, viscose is typically extruded through an annular die into a coagulating and regenerating bath to produce a tube of regenerated cellulose. The tube is subsequently washed, plasticized with glycerine and dried while inflated under substantial air pressure. After drying, the casing is wound on reels and subsequently shirred on high-speed shirring machines, such as those described in U.S. Pat. Nos. 2,010,626; 2,583,654; 2,722,714; 2,722,715; 2,723,201; and 3,451,827. In the shirring process, lengths of from about 40 to about 200 feet of casing are typically compacted (shirred) into strands of between about 4 and about 30 inches. The shirred casing strands are packaged and provided to the meat processor wherein the casing strands are deshirred at extremely high speeds while stuffing with a meat emulsion. The meat can be subsequently cooked and the casing removed from the meat processed therein with high-speed peeling machines.

It has been useful to lubricate and internally humidify cellulose casings during the shirring process by spraying a mist of water and a stream of lubricant through the shirring mandrel to increase the flexibility of the casing. Such method does reduce casing film failure and shirred strand breakage but has not proved commercially adequate. One particularly persistent type of casing failure is referred to in the art as "pinholing" and is believed to be caused by pleat-locking, an undesired adhesion of adjacent folds of a shirred casing, which tears the casing when expanded during unshirring and stuffing. Pinholing causes the tearing of the casing during the high speed stuffing thereof and can result in significant loss of time and production to the meat packer.

In U.S. Pat. No. 3,898,348, the coating of internal surfaces of cellulose sausage casings with a homogeneous mixture of a water soluble cellulose ether and an additive selected from animal, vegetable, mineral and silicon oils and alkylene oxide adducts of partial fatty acid esters has been proposed. The coating is applied to the casing surface in a composition such that the additive is present in a proportion of about 0.1 times the weight of the water soluble cellulose ether and up to about 0.5 milligrams per square inch of casing surface. While such materials have excellent peelability characteristics in that they effectively protect the casing from "pinholing" failures occasioned by pleat locking the shirred strand strength characteristics have been less than desirable, tending to be fragile, often breaking on doffing or when the strand is stuffed.

U.S. Pat. No. 4,137,947 to Bridgeford discloses a method of improving the peelability of cellulose sausage casings by the application of a meat release coating to the internal surface thereof. The coating comprises a homogeneous admixture of a water soluble cellulose ether, the partial fatty acid ester of sorbitan or mannitan and a water soluble polyalkylene ether of the type $R(-OC_2H_4O)_n-H$ wherein R represents long chain alkyl radicals having 8 to 16 carbon atoms and n is an integer from 4 to 40. An aqueous coating composition containing the water soluble cellulose ether, partial fatty acid ester and polyalkylene ether is typically applied to the interior of the sausage casing prior to shirring. While this has been a successful meat release agent for stuffed casing there are some commercial difficulties. Moisture level in the unstuffed strand must be carefully controlled or the composition may tend to provoke pleat lock or pinholing. The use of prior known anti-pleat lock agents though solving the pleat lock problem can give fragile strands, particularly when the moisture content of the strand is at the higher end of typical commercial ranges. This tendency results in a commercial problem with broken strands during handling or during introduction of the closed end and gives rise to significant yield loss during the shirring process.

Therefore, there remains a need for a release and anti-pleat lock composition that does not have the disadvantages of the prior compositions.

DISCLOSURE OF THE INVENTION

An object of this invention is to provide new release additives useful in flexible form fitting encasements.

A further object of this invention is to provide new release additives for casings used in the processing and/or packaging of food products.

A still further object of this invention is to overcome disadvantages of prior release and anti-pleat lock coatings for regenerated cellulose casing materials.

An additional object of this invention is to provide shirred casing materials with improved release characteristics.

A further object of this invention is to provide shirred regenerated cellulose casing materials with improved resistance to pinholing.

Another further object of this invention is to provide shirred casing materials with good meat release properties, strand flexibility and free of pinholes after long storage.

An additional object of this invention is to provide a release compound which is effective at reducing strand breakage in a wider range of moisture content.

These and other objects of the invention have been generally accomplished by providing an Arabinogalactan containing release and anti-pinholing composition. The Arabinogalactan is generally used in an aqueous composition with a water soluble cellulose ether. In a preferred form of the invention, the aqueous composition comprises an aqueous medium containing a cellulose ether, Arabinogalactan and a polyalkylene glycol ether. The composition of the invention results in artificial regenerated cellulose casings having excellent peelability from meat products under high speed mechanical peeling conditions. The cellulose casings having coatings of the invention can be shirred on high speed shirring machines without a substantial frequency of strand breakage and the so shirred casings of the invention can be readily deshirred in high speed stuffing operations without substantial strand breakage, pinholing or other casing failure. The casing also has sufficient strand strength to withstand normal handling required for providing end closures in the casing and placement of the strands in high speed stuffing machines. The coating composition does not cause deterioration of the casing or sticking of the pleats during storage.

Arabinogalactan is a term used to denote various water soluble polysaccharides having utility in anti-pleat lock formulations which are typically extracted from the wood gum of the western larch tree. They are highly branched polymers of arabinose and galactose usually in a ratio of about 1:6, respectively. Their polymeric fractions have a molecular weight of from about 30,000 to 100,000. The chemical and physical properties of Arabinogalactans and methods for extracting them are described in the literature and patents which include U.S. Pat. No. 2,073,616 to Acree, U.S. Pat. No. 3,323,473 to Herrick et al., U.S. Pat. No. 3,337,526 to Adams, and U.S. Pat. No. 3,509,126 to Dahl.

Arabinogalactan gum (larch gum) is water soluble, a good emulsifier, can tolerate temperatures up to between 250° and 300° F. and is available from a removable resource. It has been utilized as a low-calorie sugar substitute for foods and in the brewing industry to improve beer foam adhesion to the sides of glasses. Larch tree gum has also found use in the pharmaceutical industry as an emulsifier and in the mining industry as a flotation aid.

In the practice of this invention, the Arabinogalactan is preferably in aqueous composition with a cellulose ether. Any suitable cellulose ether may be utilized for practicing the invention, the water soluble species being preferred. Typical of such materials are methyl cellulose, carboxymethyl cellulose, ethylhydroxy ethyl cellulose, hydroxyethyl cellulose, hydroxypropyl cellulose, carboxymethyl hydroxyethyl cellulose and hydroxy-propylmethyl cellulose. A preferred material is carboxymethyl cellulose as it combines to provide superior release properties at low concentrations and is easy to process. Normally, the cellulose ethers are available as salts, particularly the sodium salts. For purposes of this invention, reference to a water soluble cellulose ether is intended to encompass the alkali and alkaline earth metal salts thereof. Generally, the molecular weight of the ether is not a limiting factor except that it must not be so great as to act as an adhesive in the coating composition. In one embodiment of the invention, cellulose ethers of low molecular weight having from about 5 to about 15 carboxy methyl groups per 10 anhydroglucose units is preferred. The cellulose ethers may be supplemented by other casing coating agents such as hemicellulose, carboxyl oxidized dextrin and carboxymethylated starch.

The coating compositions of the invention may also include other materials such as plasticizers, lubricants or materials which will aid in the storage, coloring, meat release, anti-pleat lock characteristics and the like of the coating. A preferred additional additive is one or more of the polyalkylene glycol ethers, which are incorporated primarily for their plasticizing properties. The polyalkylene glycol ethers are the condensation products of long chain fatty alcohols and alkylene oxides, generally of the type $R(-OC_2H_4O)_N-H$ wherein R represents long chain alkyl radicals having 8 to 16 carbon atoms and N is an integer from 4 to 10. Preferred polyalkylene glycol ethers are the polyoxyethylene ethers of higher fatty alcohols such as lauryl alcohol and stearyl alcohol and which have high solubility in water. Illustrative of commercially available polyethers useful in the practice of the present invention include those sold under the designation "Brij." by Atlas Chemical Industries of Delaware, for example, "Brij 35" (polyoxyethylene [23] lauryl ether). "Bri; 76" (polyoxyethylene(10) stearyl ether) "Bri; " 56 (polyoxyethylene (10) cetyl ether), and "Brij 58" (polyoxyethylene (20) ethyl ether).

In a further preferred embodiment of the invention the coating also includes a partial fatty acid ester of sorbitan or mannitan. Such ester is included primarily for its lubricant properties. The term "partial fatty acid ester of sorbitan of mannitan" includes within its meaning the palmitic, oleic and stearic acid esters. In a preferred embodiment of the invention, the partial fatty acid ester is a sorbitan ester, namely sorbitan trioleate.

The Arabinogalactan may be utilized in the coating compositions of the instant invention in any amount which provides an effective improvement in release and/or anti-pleat lock characteristics. Any suitable amount of the Arabinogalactan may be utilized in the practice of the instant invention. Generally, an amount of the Arabinogalactan between about 0.10 percent and about 2.5 percent by weight of the coating composition has been found to be suitable. A preferred formulation comprises from about 0.15 to about 0.5 percent Arabinogalactan by weight of the aqueous coating solution.

The amount of water soluble cellulose ether utilized may be any amount which gives suitable peeling properties of the casing from the meat product. Typically, the range is between about 0.25 and about 2.5 percent by weight of the coating composition. A preferred amount of between about 0.5 and about 1.5 percent by weight of the coating composition has resulted in good release properties without an excessive amount of material being utilized to produce an undesirably thick coating on the casing.

The amount of plasticizer utilized in the composition depends upon the efficiency of the plasticizer and may be any suitable amount. The preferred polyalkylene glycol plasticizers have been found effective in amounts of as little as about 0.025 percent by weight and typically are used in amounts of from about 0.05 to about 0.25 percent by weight to provide sufficient plasticizing without promoting breakage of the strand.

The amount of fatty acid ester utilized in the composition of this invention depends upon its efficiency and any suitable amount can be used. Typical amounts are from about 0.25 to about 5.0% by weight of the composition with amounts in the range of about 0.5 to about 2.5% by weight being preferred.

The coating compositions of the invention are typically homogeneous and are typically applied by spraying into the casing immediately prior to shirring. However, it should be understood that it is also within the scope of the instant invention to apply the coatings by other means such as slug coating or dip coating with or without reversal of the casing after it is coated.

The amount of coating applied to the casing may vary greatly. Generally, however, as small an amount as possible is applied to obtain the desired release and anti-pleat lock characteristics. Typically the amount of coating material composition applied to the casing is from about 0.01 mg/in$^2$ to about 0.5 mg/in$^2$ of casing.

It has also been unexpectedly found that the use of Arabinogalactan as an antipleat lock additive in cellulosic ether containing release coatings appears synergistic in that it allows an unexpected reduction of the amount of cellulosic ether used in the coating composition. Further, the viscosity of the coating material in its aqueous medium is appreciably lower than other coating materials of the prior art. This reduction in viscosity appears to be beneficial in spray systems in that it produces a superior spray pattern with very fine droplet size and allows reasonably low pressure differentials across the spray jet. The use of lower pressures in the coating system reduces maintenance problems such as seal leakage and the like.

The following examples are provided to illustrate the invention and are not intended to restrict the scope thereof. All percentages are expressed as weight percentages and all temperatures are in degrees Centigrade unless otherwise indicated. The examples and disclosures thereof are intended to be illustrative and nonexhaustive. The compositions of this invention can include ingredients having functions other than release, anti-pleat lock or plasticizing. For instance, lubricants, flavorants, colorants and/or anti-bacterial agents can be added to the compositions of the invention. Similarly, multiple various additives can be utilized with the compositions of the invention providing they do not deleteriously effect the function thereof.

EXAMPLES 1–6

Each of Examples 1–6 demonstrates the comparative effect of Arabinogalactan on coating cohesive strength when combined with typical components in various coating compositions at varying concentrations. In the experiments, aqueous coating compositions A and B containing different amounts of lubricant(Span 85-a Sorbitantrioleate from Atlas Chemical), plasticizer (Brij 35) and/or carboxymethyl cellulose (CMC7LF) or Arabinogalactan (Stractan 2-from St. Regis Paper Co.) were tested on Code 25, 3.2 cm flat width, flat stock cellulosic casing to determine their effect upon peeling. In each instance a slug of the aqueous coating composition was introduced into the casing and passed through a nip padder at 25–40 lbs/in$^2$ to produce a sandwiched film having a coating add-on of approximately 0.05 mg/sq.in. The slug coated casing was then cut into strips parallel to the axis of the casing, which were then allowed to equilibrate for approximately one week at 60% relative humidity and a temperature of 25° C. The so equilibrated coated sandwiched casing was then "T" peeled with an Instron table model Universal testing machine at 50 in/min peel speed. The aforesaid testing procedure is a very harsh test of adhesiveness/cohesiveness and is considered equivalent to a 12% moisture content casing test. Average cohesive peel is calculated by measuring the average force (gm/in) necessary to peel the film apart. Average cohesive peel of less than 10.00 is desirable. The results can be found in Table I.

TABLE I

60% RH COHESIVE PEEL STRENGTH FOR ARABINOGALACTAN FORMULATIONS

| SLUG COATING COMPOSITION | | AVERAGE COHESIVE PEEL (gm/in) |
|---|---|---|
| Composition A | 1. 1.0% CMC 7LF<br>1.0% Span 85<br>0.1% Brij 35 | 127.0 |
| | 2. 1.0% Stractan 2<br>1.0% Span 85<br>0.1% Brij 35 | 2.86 |
| | 3. 0.5% Stractan 2<br>0.5% CMC 7LF<br>1.0% Span 85<br>0.1% Brij 35 | 13.50 |
| Composition B | 4. 0.5% CMC 7LF<br>0.5% Span 85<br>0.05% Brij 35 | 9.16 |
| | 5. 0.5% Stractan 2<br>0.5% Span 85<br>0.05% Brij 35 | 4.94 |
| | 6. 0.25% Stractan 2<br>0.25% CMC 7LF<br>0.5% Span 85<br>0.05% Brij 35 | 3.64 |

As can be seen from the tabulated results the 50% substitution of Arabinogalactan (Stractan 2) in certain CMC containing compositions can result in what appears to be a synergistic effect upon cohesive peel strength. In composition A, average peel is reduced from 127.0 to 13.50 and in Composition B average peel is reduced from 9.16 to 3.64 an amount that is actually below the cohesive peel strength of compositions that do not contain CMC.

EXAMPLES 7–8

Each of the experiments in Examples 7–8 demonstrates the comparative effect of Arabinogalactan modified commercial coatings on cohesive peel strength at varying relative humidities. The coated casings were prepared and tested in the same manner as Examples 1–6 with the exception that relative humidity was varied. The results are tabulated in Table II.

TABLE II

COHESIVE PEEL STRENGTH OF ARABINOGALACTAN-MODIFIED RELEASE COATINGS

| SLUG COATING COMPOSITION | RELATIVE HUMIDITY | AVERAGE COHESIVE PEEL (g/in$^2$) |
|---|---|---|
| Commercial<br>1.0% CMC 7LF<br>1.0% Span 85<br>0.15% Brij 35 | 15%<br>32%<br>45%<br>58%<br>81% | 39.2<br>23.0<br>14.8<br>12.5<br>35.5 |
| Arabinogalactan Based<br>0.5% CMC 7LF<br>0.5% Stractan 2<br>2.0% Span 85<br>0.5% Brij 35 | 15%<br>32%<br>45%<br>58%<br>81% | 25.3<br>15.2<br>8.1<br>7.7<br>12.7 |

As can be seen the Arabinogalactan modified composition gives consistantly lower levels of cohesive peel strength at each of the tested relative humidities.

EXAMPLES 9–13

Each of the experiments in Example 9–13 demonstrate the comparative anti-pleat lock effect of Arabinogalactan modified commercial coatings on cellulosic casings. Various coating compositions, with and without mineral oil lubricants, were applied to code 23/110 cellulosic casing by spraying on a shirring machine during a shirring operation at the rate of about 14 feet/sec. Several hundred strands were produced for each coating composition. Representative samples were randomly chosen for strand strength testing. In such tests one end of the strand was clamped to a holding device, in such manner that the majority of the strand extended, without support, horizontally therefrom. At a distance of 10 cm from the holding clamp, a progressively increasing weight was applied to the strand. This test simulates typical breakage pressure on a strand in normal commercial handling. Breakage occurs when the strand depleats in such manner as to be distorted from its original rigid shirred integrety. Strand strength is defined as the product of the distance (cm) and weight (gms) applied. A strand strength of 1400 gram cm or over is considered good, for code 23/110 casing, by those practicing the art.

The coated and shirred strands were stuffed with a meat emulsion, twisted into links, cooked and then peeled by means of a high speed Ranger Appollo automatic peeling apparatus operating at between about 6 and 12 feet per second. During the stuffing phase the strands were carefully observed for pinholes or defects of any sort which could be attributable to pleat locking or adhesion. The peeling of the stuffed and cooked casing was evaluated by observing the average incidence of casing failure. An acceptable level is at least 95-97% failure free; a good level is from 97%-99.5%; an excellent level is from about 99.5% to 100% failure free.

The results of the aforementioned testing is tabulated in Table III.

TABLE III

| STUFFING, STRAND STRENGTH AND PEELABILITY | |
|---|---|
| COATING COMPOSITION | TEST RESULTS |
| 0.5% Stractan 2, | No defects - 200 strands |
| 0.5% CMC 7LF | Avg. Strand Strength - 2167 ± |
| 2.0% Span 85 | 692 gm cm |
| 0.05% Brij 35 | Peel - excellent |
| No interior lube | |
| 0.5% Stractan 2 | No defects - 200 strands |
| 0.5% CMC 7LF | Avg. Strand Strength - 2100 gm |
| 2.0% Span 85 | cm |
| 0.05% Brij 35 | Peel - Excellent |
| Normal interior lube | |
| (mineral oil) | |
| 1.0% Stractan 2 | No defects - 150 strands |
| 1.0% CMC 7LF | Avg. Strand Strength - 1400 gm |
| 1.0% Span 85 | cm |
| 0.15% Brij 35 | Peel - Excellent |
| Normal interior lube | |
| (mineral oil) | |
| 0.1% Stractan 2 | No Defects - 150 strands |
| 0.9% CMC 7LF | Avg. Strand Strength - 1926 ± |
| 1.0% Span 85 | 531 gm cm |
| 0.05% Brij 35 | Peel - Excellent |
| Normal interior lube | |
| (mineral oil) | |
| 0.25% Stractan 2 | No Defects - 200 strands |
| 0.75 CMC 7LF | Avg. Strand Strength - 2416 ± |
| 1.0% Span 85 | 639 |
| 0.05% Brij 35 | Peel - Excellent |
| Normal interior lube | |
| (mineral oil) | |
| CONTROL | |
| 1% CMC 7LF | 2 defects in 100 strands |
| 1% Span 85 | Strand Strength - 1400 gm cm |
| 0.15% Brij 35 | Peel - Good |

I claim:

1. Cellulose containing food casing having a coating thereon containing an arabinogalactan.

2. The casing of claim 1 wherein said coating comprises from about 0.01 mg/sq in. to about 0.5 mg/sq in. of the casing.

3. The casing of claim 1 wherein said coating further comprises a water soluble cellulosic ether.

4. The casing of claim 3 wherein said cellulosic ether is selected from the group consisting of methyl cellulose, carboxymethyl cellulose, ethyhydroxy ethyl cellulose, hydroxyethyl cellulose, hydroxypropyl cellulose, carboxymethyl hydroxyethyl cellulose and hydroxypropylmethyl cellulose.

5. The casing of claim 4 wherein said cellulosic ether is carboxyl methyl cellulose.

6. The casing of claim 1 wherein said coating further comprises a plasticizer.

7. The casing of claim 6 wherein the plasticizer comprises a polyalkylene glycol ether.

8. The casing of claim 1 wherein the coating comprises an arabinogalactan, a plasticizer and a cellulosic ether.

9. The casing of claim 8 wherein the coating additionally contains a lubricant.

10. The casing of claim 9 wherein said lubricant comprises sorbitan trioleate.

11. The casing of claim 8 wherein the coating comprises a sorbitan trioleate lubricant, a polyoxyethylene 23 lauryl ether plasticizer, a carboxymethyl cellulose and arabinogalactan.

12. The casing of claim 2 wherein the coating further comprises water and a mineral oil lubricant.

13. A method of imparting food release characteristics to a cellulose containing food casing comprising contacting said casing with a food release amount of an arabinogalactan.

14. The method of claim 13 wherein said arabinogalactan is applied in an aqueous composition.

15. The method of claim 14 wherein said aqueous composition additionally contains a cellulosic ether.

16. The method of claim 14 wherein said aqueous composition additionally contains a plasticizer.

17. The method of claim 14 wherein said aqueous composition additionally contains a lubricant.

18. The method of claim 16 wherein said plasticizer is a polyalkylene glycol ether.

19. The method of claim 15 wherein said cellulosic ether is selected from the group consisting of methyl cellulose, carboxymethyl cellulose, ethylhydroxy ethyl cellulose, hydroxyethyl cellulose, hydroxypropyl cellulose, carboxymethyl hydroxyethyl cellulose and hydroxy-propylmethyl cellulose.

20. The method of claim 12 wherein the coating comprises a sorbitantrioleate lubricant, a polyoxyethylene 23 lauryl ether plasticizer, a carboxymethyl cellulose and arabinogalactan.

21. A cellulosic casing coating composition comprising an arabinogalactan and a cellulose ether.

22. The composition of claim 18 which is an aqueous composition.

23. The composition of claim 22 additionally comprises a plasticizer.

24. The composition of claim 22 additionally comprises a lubricant.

25. A flexible form encasement having a coating thereon containing an arabinogalactan.

26. A food casing having a coating thereon containing an arabinogalactan.

27. The food casing of claim 26 wherein said coating further comprises a water soluble cellulosic ether.

* * * * *